United States Patent [19]
Koksbang et al.

[11] Patent Number: 5,418,090
[45] Date of Patent: May 23, 1995

[54] ELECTRODES FOR RECHARGEABLE LITHIUM BATTERIES

[75] Inventors: Rene Koksbang, San Jose; Dale R. Shackle, Morgan Hill, both of Calif.

[73] Assignee: Valence Technology, Inc., San Jose, Calif.

[21] Appl. No.: 18,939

[22] Filed: Feb. 17, 1993

[51] Int. Cl.⁶ .............................................. H01M 4/50
[52] U.S. Cl. ................................... 429/224; 252/182.1
[58] Field of Search ...................... 429/224; 252/182.1

[56] References Cited

U.S. PATENT DOCUMENTS

| | | |
|---|---|---|
| 4,464,447 | 8/1984 | Lazzari et al. |
| 4,507,371 | 3/1985 | Thackeray et al. |
| 4,830,939 | 5/1989 | Lee et al. |
| 5,110,696 | 5/1992 | Shokoohi et al. |
| 5,135,732 | 8/1992 | Barboux et al. |
| 5,147,739 | 9/1992 | Beard |

FOREIGN PATENT DOCUMENTS

0567149A1 10/1993 Japan.
0594965A1  5/1994 Japan.
2221213    1/1990 United Kingdom.

OTHER PUBLICATIONS

International Search Report Form PCT/ISA/210 dated 17 Jun. 1994 and Mailed 4 Jul. 1994.
J. M. Tarascon et al, J. Electrochem Soc. vol. 138, No. 10, Oct. 1991, pp. 2864–2868.

*Primary Examiner*—John S. Maples
*Attorney, Agent, or Firm*—Linda M. Deschere

[57] ABSTRACT

There is provided an electrochemical cell which has a non-metal negative electrode (anode on discharge). That is, no solid metal active material is used. The active material of the anode is lithium manganese oxide, $Li_xMn_yO_z$. According to another aspect of the invention, both the anode and cathode are formed of lithium manganese oxide, such as $Li_xMn_2O_4$, where the starting material for both the anode and cathode has a value of x in a range of $1 \leq x \leq 3$.

18 Claims, 2 Drawing Sheets

ELECTRODES FOR RECHARGEABLE LITHIUM BATTERIES

FIELD OF THE INVENTION

This invention relates to electrochemical batteries, and more particularly, to improved electrodes for such batteries.

BACKGROUND OF THE INVENTION

Lithium batteries, with metallic lithium electrodes, have limited life-cycle due to the degradation of the metallic lithium electrodes. Lithium is attacked and/or passivated by electrolytes. This results in formation of lithium powder with a very high surface area at the interface between the metallic lithium and the electrolyte. The formation of high surface area lithium powder is undesirable because it reacts violently with moisture and air.

In U.S. Pat. No. 4,464,447, Lazzari et al have proposed using a material of the formula $Li_xM_2O_3$ to prepare a negative electrode (anode) where M is Fe. This approach has certain limitations because the reversible capacity of such electrode appears to be rather small. In U.S. Pat. No. 5,147,739, issued Sep. 15, 1992, Beard et al suggested a composite negative electrode (anode) which includes a first phase which is an intermediate intercalation material ($Li_xCoO_2$) and a second phase which is metallic lithium. Although the intercalation material is said to have the general formula $Li_xM_aX_b$, Beard identifies only $Li_xCoO_2$ with X having a value of $0 < x \leq 1.0$. Beard conjectures that other intercalation materials based on transition metal oxides, including manganese, might be suitable for use with metallic lithium. Beard does not describe what the specific values of x, a, and b should be for an intercalation material other than the $Li_xCoO_2$. Since Beard's anodes include a metallic lithium phase, such anodes do not solve the problem of metallic lithium electrodes. In U.S. Pat. No. 5,135,732, Barboux et al suggested a method to produce lithiated manganese oxide and lithiated cobalt oxide for use as positive electrodes (cathodes) in cells having lithium metal anodes. These cathode formulations are capable of intercalating lithium, but such cathodes do not address the problem of metallic lithium anodes.

Therefore, what is needed is an improved anode which is an alternative to present metallic lithium anodes and which simultaneously fulfills the requirements of high reactivity, good charge rate capabilities and cycle life, low specific weight, stability, and low cost.

SUMMARY OF THE INVENTION

Accordingly, it is an object of the present invention to provide an improved electrochemical battery based on lithium which has improved charging and discharging cyclic characteristics, a large discharge capacity, and which maintains its integrity over a prolonged life-cycle as compared to presently used anodes. Another objective is to provide an anode active material which is an alternative to metallic lithium anodes. It is also an object of the present invention to provide anodes and cathodes of similar or essentially the same active material, which can be manufactured more economically than present anodes and cathodes having very different active materials.

According to one aspect of the invention, there is provided an electrochemical cell which has a non-metal negative electrode (anode on discharge). That is, no solid metal active material is used. Rather than the solid lithium metal of conventional anodes, the active material of the anode is lithium manganese oxide, $Li_xMn_yO_z$.

According to another aspect of the invention, both the anode and cathode are formed of lithium manganese oxide, also represented by the formula $Li_xMn_yO_z$. The $Li_xMn_yO_z$ represents possible formulations for starting materials for anodes and cathodes. Some starting materials may have essentially no lithium, that is, x equal to or near zero in a precharged state. During use of the cell, $Li+$ ions are transferred to the negative electrode upon charging. During discharge, $Li+$ ions are transferred from the negative electrode (anode) to the positive electrode (cathode). Upon subsequent charge and discharge, the $Li+$ ions are transported between the electrodes.

Thus, the $Li_xMn_yO_z$ formula represents starting material and x, y, and z vary according to the starting material selected. Furthermore, in use, x varies as Li ions are transported between electrodes. When selecting starting materials for the anode, or for both the anode and cathode, desirably, x is up to about 7; y is up to about 5; and z is up to about 12 in the starting material. Preferably, for the starting material, minimum values are as follows: x and y are each about 1 and z is about 2. As stated earlier, the value of x changes during use. For example, when an anode is prepared using starting material $Li_2Mn_2O_4$, the quantity of x in the anode varies in the range $3 \leq x \leq 4$ during use. Correspondingly, when a cathode is prepared from the same $Li_2Mn_2O_4$, the quantity of x in the cathode varies during use in a range $0 \leq x \leq 1$. The value of x may include zero for the starting material and an electrode may have a value of x equal to or near zero during use, depending on the configuration of the cell. The maximum values of x given above are related to the composition of lithium in the starting material, and the upper end of the desired range for the starting material may be exceeded during use. This is evident from the example of $Li_2Mn_2O_4$ anode and cathode where x varies between 3 and 4 for the cathode during use. Thus, the active material initial or starting condition is the composition of the active material prior to charge or discharge. The symbol "$\leq$" stands for "less than or equal to".

$Li_xMn_2O_4$ is thought to be more stable than some other Li-Mn-O formulations and it is suitable for both electrodes. Various $Li_xMn_yO_z$ formulations include $LiMn_2O_4$, $Li_2Mn_2O_4$, $Li_2Mn_4O_9$, $Li_4Mn_5O_{12}$. It should be understood that the optimum formulation of $Li_xMn_yO_z$ for an anode may be different from the optimum formulation for a cell having both electrodes of the same starting material. This is further described below.

In the case of a cell having both electrodes formed of $Li_xMn_yO_z$, the quantity of $Li_x$ in the cathode and anode, as formed (i.e. starting composition), may be the same. Thus, the active material for both electrodes may be produced using the same materials and process of manufacture.

In the case where both electrodes are made from the same material, the material selected should fulfill certain requirements: 1) the lithium content is preferably exactly at the mid-point between the end point compositions (i.e. $Li_2Mn_2O_4$); and 2) the composition range for lithium insertion to one side of the mid-point appears at low voltages and at high potentials at the other side of the mid-point. These requirements ensure a high capacity and a high operational voltage.

Advantageously, a compound like $Li_1Mn_2O_4$ can be used as an anode material, even though its voltage is relatively high (3 V vs Li), because cell performance of course depends on the cathode material in use.

Accordingly, the $Li_xMn_yO_z$ formula generally represents the composition of one or more manganese oxides having varying amounts of lithium. Some may have essentially no lithium, that is, x equal to or near zero in a precharged state or during use of the cell, as Li+ions are transported between the electrodes.

These and other objects, features and advantages will become apparent from the following description of the preferred embodiments, appended claims and accompanying drawings.

DETAILED DESCRIPTION OF THE PREFERRED EMBODIMENTS

Figure 1:
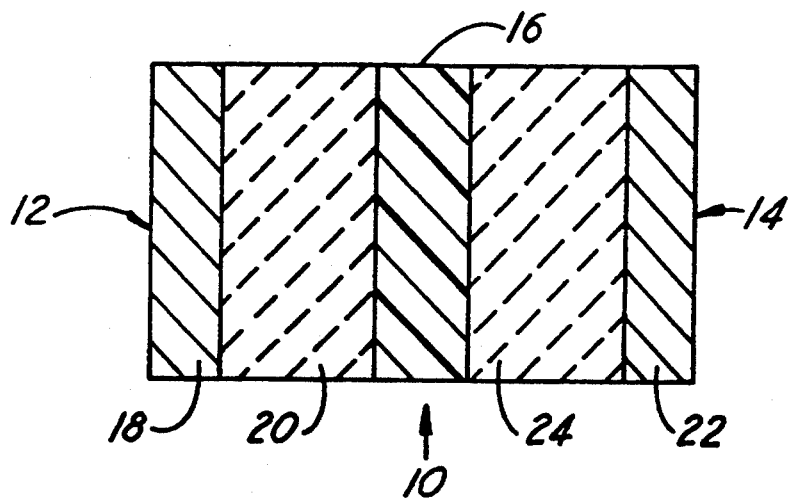
FIG. 1 is an illustration of a cross-section of a thin battery or cell embodying the invention.

An electrochemical cell or battery 10 has a negative electrode side 12, a positive electrode side 14, and a separator 16 therebetween. The negative electrode is the anode during discharge, and the positive electrode is the cathode during discharge. The negative electrode side includes current collector 18, typically of nickel, iron, stainless steel, and copper foil, and negative electrode active material 20. The positive electrode side includes current collector 22, typically of aluminum, nickel, iron, stainless steel, and copper, and such foils having a protective conducting coating foil, and a positive electrode active material 24 which may be the same as or different than the negative electrode active material 20. The separator 16 is typically a solid electrolyte, separator/electrolyte. A suitable separator/electrolyte is described in U.S. Pat. No. 4,830,939, and is a solid matrix containing an ionically conducting liquid with an alkali metal salt and the liquid is an aprotic polar solvent.

According to one aspect of the invention, the active material of the negative electrode (anode on discharge), is lithium manganese oxide, $Li_xMn_yO_z$.

According to another aspect of the invention, both the negative and positive electrodes are formed of lithium manganese oxide, of the formula $Li_xMn_yO_z$. The $Li_xMn_yO_z$ represents possible formulations for starting materials for anodes and cathodes. Some starting materials may have essentially no lithium, that is, x equal to or near zero in a precharged state. During use of the cell, Li+ ions are transferred to the negative electrode upon charging. During discharge, Li+ ions are transferred from the negative electrode (anode) to the positive electrode (Cathode). Upon subsequent charge and discharge, the Li+ ions are transported between the electrodes.

Thus, the $Li_xMn_yO_z$ formula represents starting material and x, y, and z vary according to the starting material selected. Furthermore, in use, x varies as Li ions are transported between electrodes. When selecting starting materials for the anode, or for both the anode and cathode, desirably, x is up to about 7; y is up to about 5; and z is up to about 12 in the starting material. Preferably, for the starting material, minimum values are as follows: x and y are each about 1 and z is about 2. As stated earlier, the value of x changes during use. For example, when an anode is prepared using starting material $Li_2Mn_2O_4$, the quantity of x in the anode varies in the range $3 \leq x \leq 4$ during use. Correspondingly, when a cathode is prepared from the same $Li_2Mn_2O_4$, the quantity of x in the cathode varies during use in a range $0 \leq x \leq 1$. The value of x may include zero for the starting material, and an electrode may have a value of x equal to or near zero during use, depending on the configuration of the cell. The maximum values of x given above are related to the composition of lithium in the starting material and the upper end of the desired range for the starting material may be exceeded during use. This is evident from the example of the $Li_2Mn_2O_4$ anode and cathode where x varies between 3 and 4 for the cathode during use. Thus, the active material initial or starting condition is the composition of the active material prior to charge or discharge.

$Li_xMn_2O_4$ is thought to be more stable than some other Li-Mn-O formulations and it is suitable for both electrodes. Various $Li_xMn_yO_z$ formulations include $LiMn_2O_4$, $Li_2Mn_2O_4$, $Li_2Mn_4O_9$, $Li_4Mn_5O_{12}$, $Li_7Mn_5O_{12}$. It should be understood that the optimum formulation of $Li_xMn_yO_z$ for an anode may be different from the optimum formulation for a cell having both electrodes of the same starting material. This is further described below.

In the case of a cell having both electrodes formed of $Li_xMn_yO_z$, the quantity of $Li_x$ in both the positive and negative electrodes as formed, (i.e. starting composition), may be the same. Thus, the active material for both electrodes may be produced using the same materials and process of manufacture. In the case where both electrodes are made from the same material, $Li_2Mn_2O_4$ and compounds with similar properties (see FIG. 2) are suitable. There are several other lithium manganese oxides which can be used as starting materials similarly to the use of $LiMn_2O_4$ for preparation of the reduced form needed for a battery with identical electrodes: $Li_2Mn_2O_4$. Examples are $Li_2Mn_4O_9$, $Li_4Mn_5O_{12}$, and $Li_7Mn_5O_{12}$.

A compound like $Li_1Mn_2O_4$ can be used as an anode material, even though its voltage is relatively high (3 V vs Li), because cell performance of course depends on the cathode material in use. A 4-4.5 V cathode material permits the use of a 1.5 V $Li_xMn_yO_z$ anode material since the voltage is close to 3 V. An even higher anode voltage is thought to be acceptable since the voltage of common cathode materials i.e $V_6O_{13}$ vary between about 2 and 3 V vs Li, when both anode and cathode are to be of the same material $Li_2Mn_2O_4$ is preferred over $Li_1Mn_2O_4$.

Accordingly, the $Li_xMn_yO_z$ formula generally represents the composition of one or more manganese oxides having varying amounts of lithium. Some may have essentially no lithium, that is, x equal to or near zero in a precharged state.

During use of the cell, Li+ ions are transferred to the negative electrode upon charging, and during discharge, Li+ ions are transferred to the positive electrode. Upon subsequent charge and discharge, the Li+ ions are transported between the electrodes. Meanwhile, Mn varies between oxidation states. The oxidation state variation of the Mn depends on the use of the manganese oxide. Consider the use $Li_2Mn_2O_4$ as both anode and cathode material, and two different situations:

| 2 V battery configuration: | | |
|---|---|---|
| Cathode | | Anode |
| $Li_1Mn_2O_4$ Mn (3.5) | ← $Li_2Mn_2O_4$ Mn (3.0) → | $Li_3Mn_2O_4$ Mn (2.5) |

In this case, the average oxidation state varies between 3 and 3.5 in the cathode and between 3 and 2.5 in the anode. The average amount of Li in the anode varies between 2 and 3 and the average amount of Li in the cathode varies between 1 and 2.

| 2 V and 3 V combination: | | |
|---|---|---|
| Cathode | | Anode |
| $Mn_2O_4$ Mn (4.0) | ← $Li_2Mn_2O_4$ Mn (3.0) → | $Li_4Mn_2O_4$ Mn (2.0) |

Figure 2:
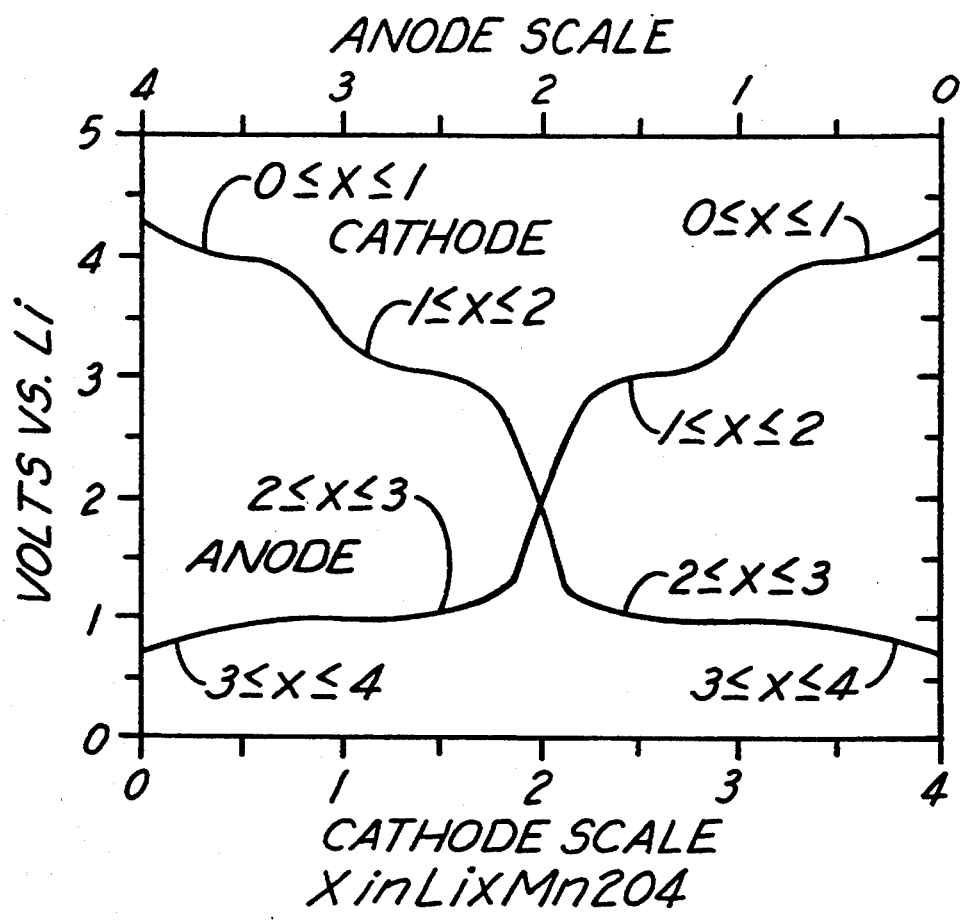
FIG. 2 is a graph of potential for two $Li_xMn_2O_4$/Li couples for various values of x.
Figure 3:
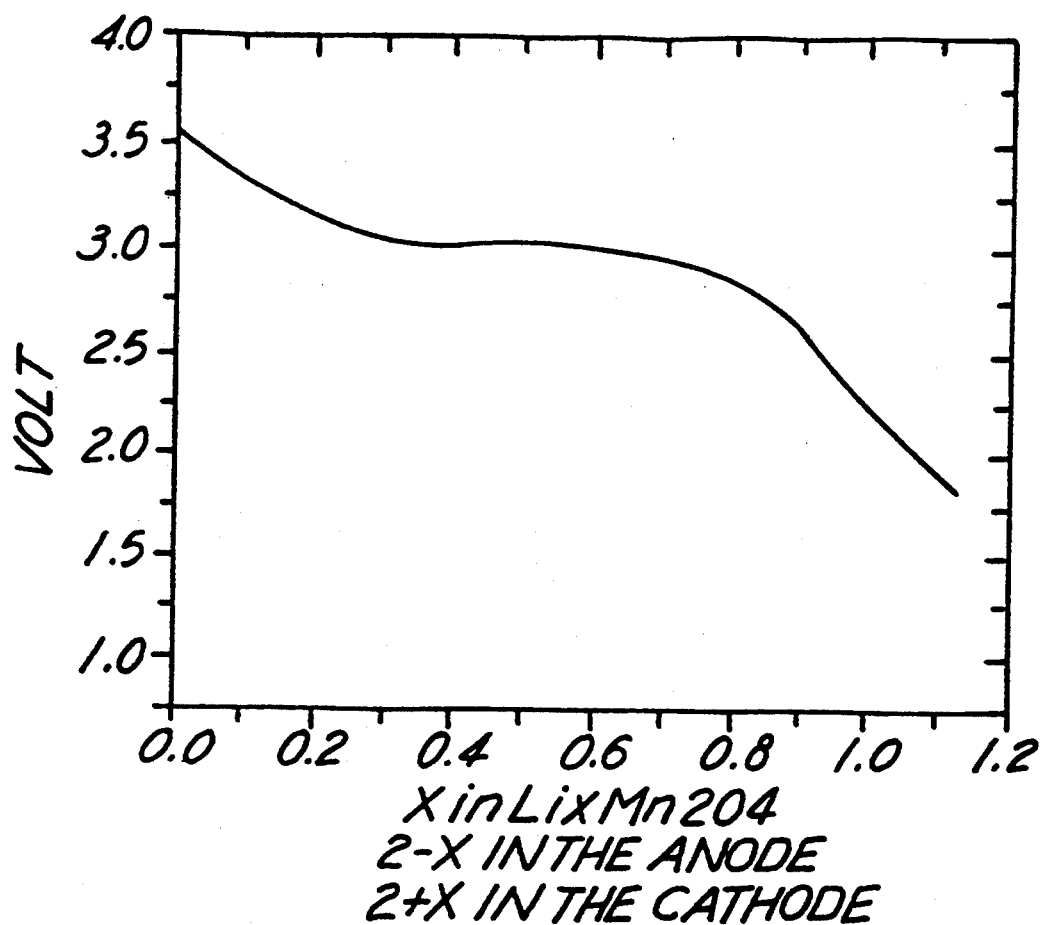
FIG. 3 is a graph of potential derived from the two $Li_xMn_2O_4$ couples of FIG. 2 with 1 Li per formula unit corresponding to 150 Ah/kg and 450 Wh/kg; and based on: $Li_xMnO_2$ with d equal to 5.5 g/cm$^2$; $V_6O_{13}$ with d equal to 3.8 g/cm$^2$; the equivalent energy density is $450 \times 5.5/3.8$ equals 650 Wh/kg.

In this case, the oxidation state varies between 3 and 4 in the cathode and between 2 and 3 in the anode. The average amount of Li in the anode varies between 2 and 4 and the average amount of Li in the cathode varies between 0 and 2. The 3 V battery is thus realized by cycling the cathode between oxidation states 3.5 and 4, and the anode between 2.5 and 3. Here the average amount of Li in the anode is about 2 to about 3 and in the cathode about 2 to about 1. Continued cycling at 3 V, as illustrated in FIGS. 2 and 3, are achieved by cycling the cathode in the range $0 \leq x \leq 1$ (at ca. 4 V), and the anode is cycled in thee range $3 \leq x \leq 4$ (at 1 V).

In both cases, the oxidation state of the anode varies between $+2$ and $+3$. However, the oxidation state of the cathode always varies between 3 and 4.

With $LiCoO_2$ as the cathode material, $LiCoO_2$ is assumed to be 4.3 V average:

| Cathode: | | | |
|---|---|---|---|
| $Li_1CoO_2$ | → $CoO_2$ (x = 0 in the ideal case, usually not achievable) | | |
| Anode: | | | |
| Case 1) $LiMn_2O_4$ | → $Li_2Mn_2O_4$ $_{Mn\ (3.5)}$ | → Mn (3) | 1.3 V |
| Case 2) $Li_2Mn_2O_4$ | → $Li_3Mn_2O_4$ $_{Mn\ (3)}$ | → Mn (2.5) | 3.3 V |
| Case 3) $Li_3Mn_2O_4$ | → $Li_4Mn_2O_4$ $_{Mn\ (2.5)}$ | → Mn (2) | 3.3 V |

As seen, Cases 2 and 3 both have reasonable voltages for use in batteries whereas Case 1 is less useful.

It is thus possible to construct a battery in which the oxidation state of the manganese varies between $+2$ and $+3$.

Accordingly, when a single composition $Li_xMn_yO_z$ is to be optimized for use as both anode and cathode, and $Li_2Mn_2O_4$ is selected as the starting material, during cycling the cathode composition can vary in the range of $0<x<1$; and simultaneously, the anode composition will vary in a range of $3<x<4$. In the case where an $Li_xMn_yO_z$ composition is to be optimized for use in an anode, and $LiMn_2O_4$ is selected, the value of x is in a range of $2<x<4$, where the cathode is of a different material, in order to keep the voltage as close to 1 volt as possible.

The $Li_xMn_2O_4$ powders which form the basis of the active material for the anode, can be prepared by a method as described by J. M. Tarascon and D. Guyomard in an article entitled "Li Metal-Free Rechargeable Batteries Based on $Li_{1+x}Mn_2O_4$", published in J. Electrochem. Soc., Volume 138, and as described by Barboux, Tarascon et al in U.S. Pat. No. 5,135,732, issued Aug. 4, 1992. These references are illustrative of suitable methods and are not limiting these methods produced active material which currently is only used as the cathode (positive electrode) active material. Such methods are used to produce positive electrodes for use with negative electrodes of metallic lithium.

Surprisingly, the present invention can use one type of active material for both the negative and positive electrodes. Negative electrodes can be similarly prepared for use with various lithium-containing positive electrodes. Suitable active material is prepared by hydrolyzing manganese or acetates or other carboxylates in an aqueous solution, the hydrolysis being promoted by the addition of the hydroxides of lithium and ammonium which control the pH of the solution. Hydrolysis is initiated by the addition of lithium hydroxide and completed by the use of a base that can be removed thermally. This base may be selected from among any organic base or ammonium hydroxide which is preferred for use herein. This low temperature process yields a gel-like product which may be heated at 200° C. to 500° C. temperatures to form thin or thick films of $LiMn_2O_4$ of a desired grain size.

It is known that $Li_2Mn_2O_4$ forms at an open circuit voltage close to 3 V vs $Li/Li^+$, similar to the redox ($I_3/I$) system. The electrochemical reaction is as follows: $LiMn_3O_4 + 3x/2LiI \rightarrow Li_{1+x}Mn_3O_4 + x/2LiI_3$. It has been determined that at 82° C., the composition $Li_2Mn_2O_4$ can be obtained with a reasonable excess of LiI. At a given temperature, $Li_{1+x}Mn_2O_4$ powders of well defined composition ($0<x<1$) are obtained by adjusting the amount of LiI. The material prepared as described above was used as the active material in positive and negative electrodes.

The negative electrode (anode on discharge) and the positive electrode are prepared by the above described method to obtain $Li_2Mn_2O_4$ in both electrodes. The same materials and processes can be used for manufacture of both cathode and anode producing a battery which has a voltage between 2 and 3 V, as derived from FIG. 2 and as shown in FIG. 3.

FIG. 2 shows two voltage curves which are essentially mirror images of each other and illustrates the voltage variations during the cathode reaction and the anode reaction. All four plateaus are clearly distinguishable for both electrodes and the composition ranges associated with each electrode reaction are indicated in the figure. The curves are based upon expected cell potential upper plateau only, which is used for cathodes. Not shown is a plateau at one volt, which represent an identical capacity.

The capacity according to FIG. 2, at the high voltage plateau, is approximately 180 Ah/kg. The same capacity can be achieved when the same material is used as negative electrode, but at one volt vs. lithium.

The starting composition for both electrodes in FIG. 3 is $Li_2Mn_2O_4$, although other manganese oxides are also suitable. The curve of FIG. 3 was derived as the difference between the two curves of FIG. 2 in the composition range $0<x<1$ for the cathode and in the range $3<x<4$ for the anode. A set of data points from FIG. 2 will illustrate how FIG. 3 was developed, as follows. The 3.5 V value of FIG. 3 is the difference between 4.25 V and 0.75 V at $x=0$ of FIG. 2. In FIG. 3, at 3.5 V, the negative electrode (anode) has a total Li content of about $x=3$ and the positive electrode (cathode) has a total Li content of about $x=1$. In FIG. 3, at about 2.0 V, the negative electrode (anode) has a total Li content of about $x \geq 2$ and the positive electrode (cathode) has a total Li content of about $x \leq 2$.

Although $Li_xMn_2O_4$ has been used as an example, all presently known Li—Mn—O compounds may be used as anode materials since they all are characterized by a plateau at one volt. Thus, it is possible to design and construct batteries with two "identical" electrode starting materials anode/electrolyte/cathode, similar to the example: $Li_xMn_2O_4$/Electrolyte/$Li_xMn_2O_4$.

Although not wishing to be limited to any particular theory, it is believed that the $Li_xMn_2O_4$ manganese oxide provides good results because of the reversible lithium intercalation reaction. Other manganese oxides are expected to perform in a similar manner for the reasons described above. Methods for forming other manganese oxide materials are known in the art, as are chemical and electrochemical methods for including lithium in various materials. The $Li_xMn_yO_z$ formula generally represents the composition of one or more manganese oxides having varying amounts of lithium. Some may have essentially no lithium in a precharged state.

As stated earlier, during charging, the lithium cations are deintercalated from the lithium bearing positive electrode which is the cathode during the discharge cycle. During charging, lithium cations are intercalated into the negative electrode which is the anode during the discharge cycle. Since the anode and cathode active materials are essentially the same, the amount of lithium moved between them is directly correlated, so that the reversible capacity of the cell is essentially undiminished. This is in contrast to conventional carbon negative electrodes (anodes) where the first intercalation of lithium into the carbon electrode, always results in a reduction in capacity. Thus, additional lithium bearing positive electrode (cathode) material must be included in conventional cells, compared to the amount required if the reversible capacity were undiminished. Such loss in capacity is not expected to occur in the cell of the invention. Both electrodes consist of essentially the same active material, and the reversible capacity of each electrode should remain relatively undiminished.

A key advantage of the invention is the elimination of metallic lithium from the battery. This eliminates problems with metallic electrodes such as degradation and renders the battery more safe. These advantages offset the relatively lesser capacity of this battery (150–200 Ah/kg) as compared to metallic Li batteries. Other advantages are: 1) the battery is assembled in the discharge state (actually at 0 V) and the processing is, therefore, inherently more safe, especially in connection with large batteries (traction and load leveling); 2) because of the 0 V condition, larger amounts of small batteries can be shipped, presumably with less restrictions than lithium metal containing batteries; 3) in the fully charged state, assuming that only the 3 V plateau depicted in FIG. 3 is used in the application, an additional 50% excess capacity exists at ca. 2 V, which can act as an overcharge protection or an indication that the battery needs to be recharged; 4) the battery can be fully discharged to 0 V without damage, at least from an electrode point of view. It is even possible to reverse the voltage without damage. Because the electrodes are identical, reversal of the battery voltage only means that the positive electrode becomes the negative electrode, and the negative electrode becomes the positive electrode. Compared to probably any other lithium battery technology known today, this invention is, therefore, extremely safe.

While this invention has been described in terms of certain embodiments thereof, it is not intended that it be limited to the above description, but rather only to the extent set forth in the following claims.

The embodiments of the invention in which an exclusive property or privilege is claimed are defined in the appended claims.

We claim:

1. A lithium battery which comprises a positive electrode and a negative electrode, said negative electrode having an active material consisting of lithium manganese oxide of the general formula $Li_xMn_yO_z$ where x is greater than 1, y is greater than or equal to 1, and z is greater than or equal to 2.

2. A lithium battery which comprises a positive electrode, a negative electrode and an electrolyte, said negative electrode having an active material consisting of lithium manganese oxide, and wherein the initial condition of the active material of the negative electrode is represented by the general formula $Li_xMn_yO_z$ where x is greater than 1 and less than or equal to 7, y is in a range of $1 \leq y \leq 5$, and z is in a range of $2 \leq z \leq 12$.

3. A lithium battery which comprises a positive electrode, a negative electrode and an electrolyte, said negative electrode having an active material consisting of a compound of the general formula $Li_xMn_2O_4$, where the value of x is in a range of $2 \leq x \leq 4$.

4. A lithium battery which comprises a positive electrode and a negative electrode, both of said electrodes having an active material consisting of lithium manganese oxide, and wherein during cycling (charge and discharge) the average oxidation state of Mn varies between 2 and 3 in the negative electrode and between 3 and 4 in the positive electrode.

5. A lithium battery which comprises a positive electrode, a negative electrode and an electrolyte, both of said electrodes having an active material consisting of lithium manganese oxide, and wherein the active material initial condition is represented by the general formula $Li_xMn_yO_z$ where x is in a range of $1 \leq x \leq 7$, y is a range of $1 \leq y \leq 5$, and z is in a range of $2 \leq z \leq 12$.

6. The battery according to claim 5 wherein in an initial condition, the active material of the positive and negative electrodes are different.

7. The battery according to claim 5 wherein in an initial condition, the active material of the positive and negative electrodes are the same.

8. A lithium battery having non-metallic electrode active material and comprising a positive electrode and a negative electrode, both of said electrodes having an active material consisting of a compound of the general formula $Li_xMn_2O_4$, where the value of x for both of the electrodes in an initial condition is in a range $1 \leq x \leq 3$.

9. The battery according to claim 8, wherein during cycling (charge and discharge) the negative electrode has the value x in a range of $3 \leq x \leq 4$.

10. The battery according to claim 8, wherein during cycling (charge and discharge) the positive electrode has the value x in a range of $0 \leq x \leq 1$.

11. The battery according to claim 8, wherein during cycling (charge and discharge) the negative electrode has the value x in a range of $2 \leq x \leq 4$.

12. The battery according to claim 8, wherein during cycling (charge and discharge) the positive electrode has the value of x in a range of $0 \leq x \leq 2$.

13. A negative electrode comprising an active material consisting of lithium manganese oxide in an initial condition represented by the general formula $Li_xMn_2O_4$ where x is 2, and where during cycling (charge and discharge) the average oxidation state of Mn varies between 2 and 3.

14. A battery having a negative electrode and a positive electrode, both of said electrodes comprising an active material consisting of lithium manganese oxide, and wherein the initial condition of the active material of both of the electrodes is represented by the general formula $Li_xMn_2O_4$ where x is about 2.

15. The battery of claim 14, wherein during cycling (charge and discharge) the lithium manganese oxide of the negative electrode is represented by the general formula $Li_xMn_2O_4$, where the value of x is in a range of $2 \leq x \leq 4$.

16. The battery of claim 14 wherein during cycling (charge and discharge) the lithium manganese oxide of the negative electrode is represented by the general formula $Li_xMn_2O_4$, where the value of x is in a range of $3 \leq x \leq 4$.

17. The battery of claim 14 wherein during cycling (charge and discharge) the lithium manganese oxide of the positive electrode is represented by the general formula $Li_xMn_2O_4$, where the value of x is in a range of $0 \leq x \leq 2$.

18. The battery of claim 14 wherein during cycling (charge and discharge) the lithium manganese oxide of the positive electrode is represented by the general formula $Li_xMn_2O_4$, where the value of x is in a range of $0 \leq x \leq 1$.

* * * * *